United States Patent [19]

Boudigues

[11] Patent Number: 4,463,553
[45] Date of Patent: Aug. 7, 1984

[54] TURBOJET WITH CONTRAROTATING WHEELS

[75] Inventor: Serge Boudigues, Sceaux, France

[73] Assignee: Office National d'Etudes et de Recherches Aerospatiales, Chatillon, France

[21] Appl. No.: 381,023

[22] Filed: May 24, 1982

[30] Foreign Application Priority Data

May 29, 1981 [FR] France ............................ 81 10725

[51] Int. Cl.³ .................................................. F02K 3/00
[52] U.S. Cl. ...................................... 60/268; 60/39.162
[58] Field of Search .............. 60/268, 39.161, 39.162; 415/66, 68, 69; 416/128

[56] References Cited

U.S. PATENT DOCUMENTS

| | | | |
|---|---|---|---|
| 2,639,583 | 5/1953 | Steele | 60/39.162 |
| 3,363,831 | 1/1968 | Garnier | 415/69 X |
| 3,379,366 | 4/1968 | Garnier | 415/69 X |
| 3,391,540 | 7/1968 | Bauger et al. | 60/39.162 X |
| 3,524,318 | 8/1970 | Bauger et al. | 60/39.162 X |
| 3,673,802 | 7/1972 | Krebs et al. | 60/268 X |
| 3,861,139 | 1/1975 | Jones | 60/268 X |

FOREIGN PATENT DOCUMENTS 459613 7/1953 Fed. Rep. of Germany.

Primary Examiner—Louis J. Casaregola
Assistant Examiner—Donald E. Stout
Attorney, Agent, or Firm—Roberts, Spiecens & Cohen

[57] ABSTRACT

A turbojet having a multistage axial compressor with contrarotating blade wheels fitted on inner and outer contrarotating rotors driven in opposite directions by respective turbine wheels.

Each blade wheel (105) of the outer compressor rotor is associated with a rotating shell (86, 81, 82) having relatively few thick spokes for transmitting the drive from the turbine wheel, thereby leaving the blades to transmit aerodynamically induced forces only.

8 Claims, 4 Drawing Figures

TURBOJET WITH CONTRAROTATING WHEELS

The invention relates to a turbojet having a multistage axial compressor with contrarotating wheels.

BACKGROUND OF THE INVENTION

In such a turbojet, mechanical drive to at least one of the compressor wheels must be transmitted inwardly from the periphery of the turbojet rather than outwardly from a central shaft. In other words there must be an outer rotor assembly as well as an inner rotor assembly. Driving the wheels that depend from the outer rotor presents a problem which up to the present has not been solved adequately for contrarotating turbojets to enable them to be implemented on an industrial scale.

Driving these wheels from their periphery leads to the blades transmitting mechanical forces. However, the blades are shaped mainly as a function of aerodynamic considerations: in particular these require the blades to be extremely thin to satisfy aerodynamic conditions, especially when the air flow is supersonic, and such blades are generally unsuitable for transmitting mechanical drive forces.

Further, while the ends of the blades in turbojets that do not use contrarotation are free, proposed embodiments of contrarotating wheels call for the blades to be fixed not only at their inner ends, ie. where closest to the axis, but also at their outer ends. When the turbojet is in operation, the inner and outer fixed ends are at different temperatures, thus introducing stress factors of thermal origin and an additional source of deformation.

Preferred embodiments of the present invention eliminate the above-mentioned drawbacks.

SUMMARY OF THE INVENTION

The present invention provides a turbojet having a multistage axial compressor with contrarotating bladed wheels in an assembly comprising both an outer rotor driven by a first turbine wheel and an inner rotor driven by a second turbine wheel which rotates in the opposite direction to the first turbine wheel during operation of the turbojet, wherein each of the bladed compressor wheels forming a part of the outer rotor is associated with a corresponding rotating shell having spokes which are thick relative to the thickness of the compressor wheel blades.

The spokes may be radial or otherwise.

The compressor wheel thus no longer has to transmit mechanical forces, and, furthermore, the ends of its blades are advantageously left free.

In other words, in accordance with the invention, each compressor blade wheel which, in a conventional contrarotating arrangement, would be required to transmit both aerodynamic forces and structural forces, is replaced by an assembly comprising a rotating shell transmitting the structural forces and a blade wheel transmitting only aerodynamic forces.

The invention is applicable both to single flow turbojets, and to dual flow turbojets.

BRIEF DESCRIPTION OF THE DRAWINGS

In the following description, given by way of example, reference is made to the accompanying drawings, in which.

MORE DETAILED DESCRIPTION

Figures 1, 2:
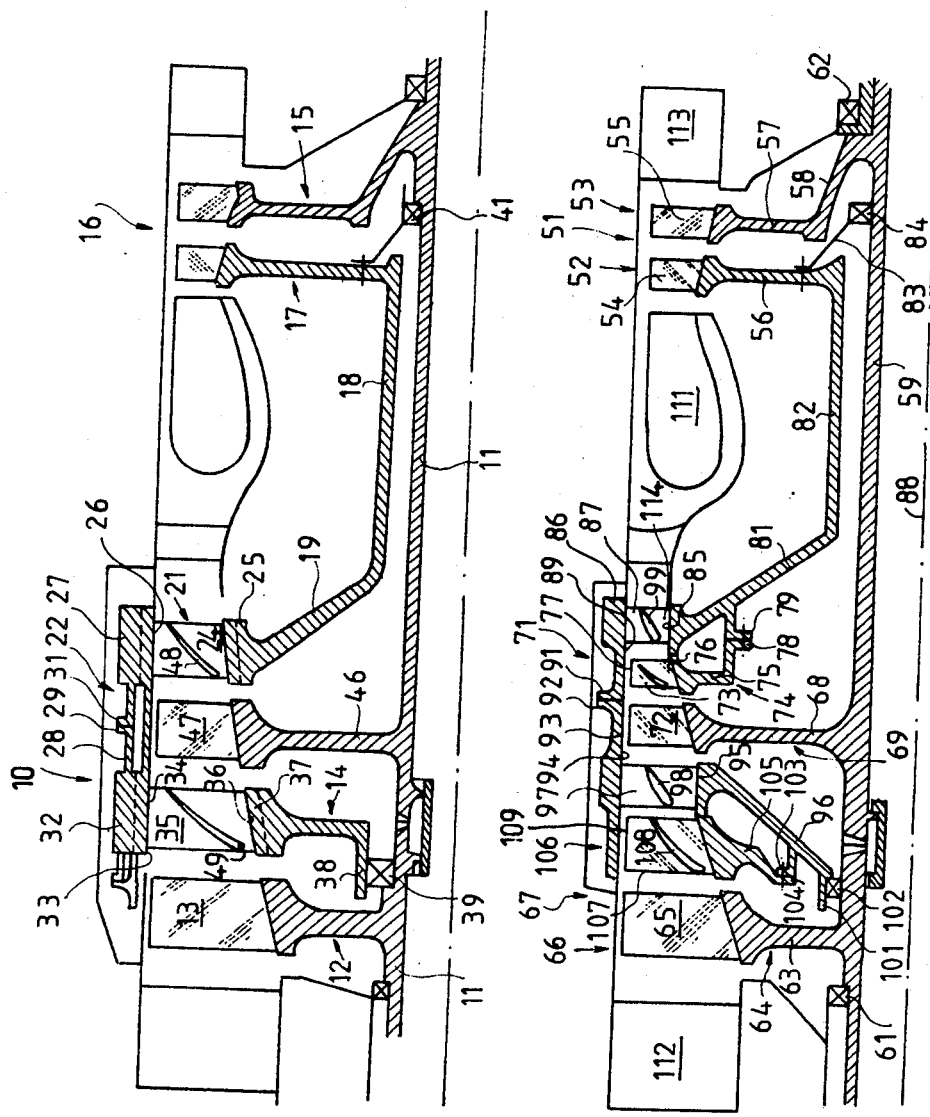
FIG. 1 is a diagrammatic view of a prior art contrarotating turbojet.
FIG. 2 is a diagrammatic view of a turbojet in accordance with the invention.

Reference is made initially to FIG. 1 which relates to a conventional single flow turbojet having contrarotating wheels.

A shaft 11 of a turbojet has an inlet wheel 12 forming part of a compressor 10 mounted thereon. The wheel 12 has blades 13. A wheel 14 which is driven in the opposite direction to the wheel 12 is placed immediately downstream from the wheel 12. While the wheel 12 is driven by virtue of a wheel 15 of the turbine 16 being made fast to the shaft 11, the wheel 14 is driven by a turbine wheel 17 rotating in the opposite direction to the wheel 15 and connected to a hollow shaft 18 disposed around the shaft 11. The shaft 18 bears a conical plate 19 which is directly connected to the downstream wheel 21 of the second stage 22 of the compressor 10 whose first stage is constituted by the wheels 12 and 14. The blades 24 of the wheel 21 are fixed at their bases to the rim 25 of wheel 21 and they are fixed at their outer ends 26 to a peripheral sleeve 27. The sleeve 27 is connected to a sleeve 32 by a coupling ring 28 having intermediate flanges 29 and 31. The outer ends 34 of blades 35 forming part of the wheel 14 are fixed to the inside surface of the sleeve 32 while their bases 36 are fixed on the rim 37 of the wheel 14.

The wheel 14 is rotatably mounted on the shaft 11 via a sleeve 38 and a bearing 39, and the turbine wheel 17 is likewise fitted on shaft 11 via a bearing 41.

In this arrangement the wheel 14 is driven by the turbine wheel 17 not only by means of the intermediate shaft 18 and the conical plate 19, but also by the blades 24 of the wheel 21 and the blades 35 of the wheel 14. However, the air flow passing the blades 35 is supersonic relative thereto, and likewise, after passing through the wheel 46 of the second stage 22 of the compressor 10 in the gaps between the blades 47 thereof, the air passes the blades 24 of the wheel 21 at a supersonic speed relative thereto.

The blades 24 and 35 are both shaped on the basis of aerodynamic considerations imposed by the supersonic speed of the air they act on: they are thin as indicated on the figure at 48 and 49 respectively. They are thus unsuitable for transmitting mechanical drive forces. Further, they are subjected to different temperatures at their inner and their outer ends, which provides an additional deforming and stressing factor.

FIG. 2 shows a turbojet in accordance with the invention. The turbine or turbine stage 51 of the turbojet comprises a high pressure wheel 52 and a low pressure wheel 53 turning in opposite directions. These wheels have blades 54 and 55 fixed around the periphery of respective disks 56 and 57. The disk 57 of the low pressure wheel 53 depends from a conical plate 58 directly mounted on a shaft 59 which is rotatably mounted at its ends in bearings 61 and 62. A disk 63 depends from the shaft 59 to form a part of the first blade wheel 64 of the first stage 66 of the compressor 67. The wheel 64 has blades 65.

A disk 68 also depends directly from the shaft 59 to form a part of the inlet wheel 69 of the second stage 71 of the compressor. This wheel has blades 72. Downstream from the blades 72 are blades 73 of a wheel 74 which constitutes the outlet wheel of the second stage 71, and which comprises an annular disk 75 with a rim 76 on which blades 73 are mounted with their ends free. The annular disk 75 has a flange 78 by which is connected to the flange 79 of a conical plate 81 which depends from a tubular shaft 82 which is itself connected to the disk 56. This assembly is rotatably mounted on the shaft 59 by means of a conical sheet 83 and a bearing 84. The conical plate 81 ends in an inner rim 85 which is connected to a coupling ring 86 by means of a small number, say five, thick radial spokes 87 angularly spaced around the axis 88 of the turbojet. The streamlined cross section of the spokes 87 is outlined at 99. The coupling ring 86 has a cylindrical inside surface 89 which is at a distance from the outer ends 77 of the blades 73. Flanges 91 and 92 connect coupling ring 86 to a coupling ring 93 whose inside surface 94 constitutes an extension of the inside surface 89. The coupling ring 93 is connected to an inner rim 95 of a conical plate 56 via five, for example, radial spokes 97 having a streamlined cross section outlined at 98. The coupling ring and conical disk assembly may be cast, or else milled from a solid forging. The conical plate 96 rests on a sleeve 101 rotatably mounted on the shaft 59 via a bearing 102. The conical plate 96 is connected via flanges 103 and 104 to a disk 105 which constitutes a part of the second wheel 106 of the first stage 66 of the compressor 67. This wheel has blades 107 of a cross section indicated at 108 and having their outer ends 109 at a distance from the inside surface 94 of the coupling ring 93. The turbojet has an annular combustion chamber 111 located between the compressor 67 and the turbine 51.

Air entering the inlet 112 to the compressor passes though the first wheel 64 of the first compressor stage 66. It then passes through the second wheel 106 which turns in the opposite direction to the wheel 64. On leaving the first stage 66, the air passes through an annular space between the inner rim 95 and the coupling ring 93 without the flow being substantially modified since the space is practically empty and the gases flow at subsonic speeds around the streamlined spokes 97. The fact that the rim, the spokes and the coupling ring are all in one piece ensures long term unchanging rigidity and helps to equalize temperatures between the inner and outer zones thereof. The air then passes through the second stage 71 of the compressor, firstly through its first wheel 69 which is driven in the same direction as the wheel 64, and then through the second wheel 74 of said second stage which rotates in the opposite direction to the first wheel, and hence in the same direction as the second wheel 106 of the first stage. The air leaving the second wheel 74 passes through the annular space 114 between the coupling ring 86 and the rim 85 without its flow being substantially modified. The air is then heated in the combustion chamber 111, and the high temperature and high pressure mixture of gases then drives firstly the high pressure wheel 52 of the turbine and then the lower pressure wheel 53 before directed to the exhaust nozzle via a conduit 113.

Neither the blades 73 of the compressor second stage outlet wheel 74, nor the blades 107 of the compressor first stage outlet wheel 106 are subjected to mechanical force for driving said outlet wheels from the low pressure turbine wheel 53. In each case, the drive is via a respective conical plate 81 or 96. The transmission of motion is effected via relatively thick spokes 87 or 97 which can therefore be formed from the same piece of metal as the rims 85 or 95 and coupling rings 86 or 93 respectively. Since the blades 73 and 107 are only fixed at their inner ends, their outer ends 77, 109 are free. In this arrangement, breakage of a blade does not give rise to the same disastrous consequences as in the known arrangement in which a broken blade leads rapidly to the high pressure rotor bursting.

Figure 3:
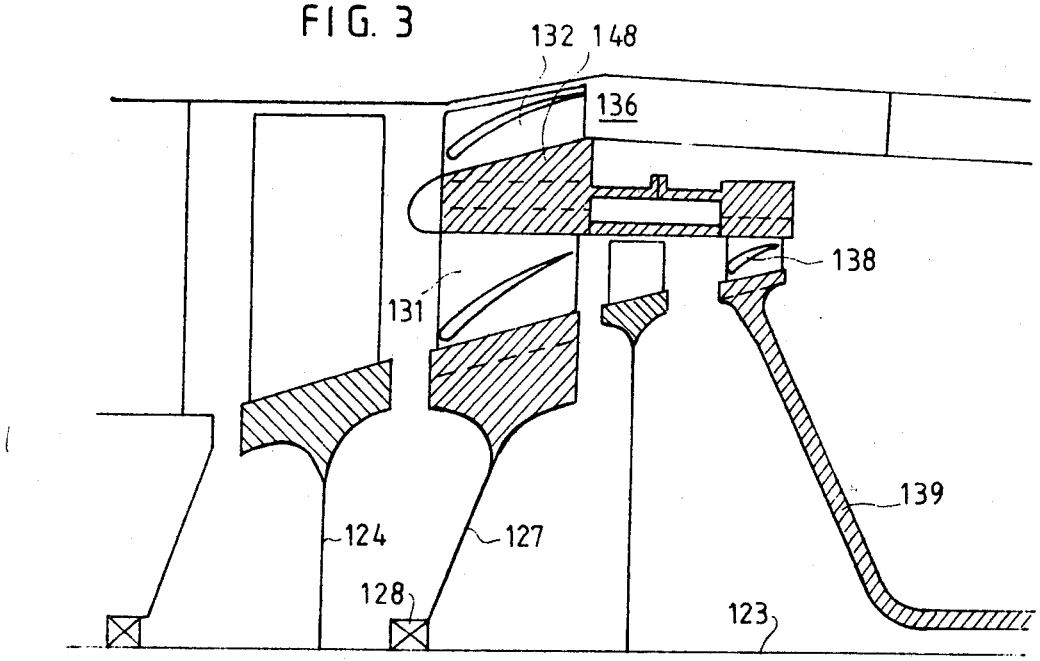
FIG. 3 is a diagrammatic view of a prior art dual flow contrarotating turbojet.

Reference is now made to FIG. 3. In this known embodiment of a dual flow turbojet having contra-rotating wheels, the first stage of the axial compressor is constituted by wheels 124 and 127 rotating in opposite directions, with the wheel 124 being mounted on a shaft 123 driven by a turbine wheel (not shown), and with the wheel 127 mounted on said shaft via a bearing 128 and driven by means of its blades 131 which are made fast to a streamlined annular wall or intermediate disk 148. The disk 148 is driven by blades of a wheel 138 which are made fast to a conical plate 139 which is itself driven by a turbine wheel (not shown). The blades of the outlet wheel of the first compressor stage are extended at 132 in front of the inlet to a conduit 136 for the secondary flow of air.

In this arrangement, both the blades 131 and the blades 138 transmit mechanical drive forces, even though their shapes are determined by aerodynamic considerations and are not at all suitable for this purpose.

Figure 4:
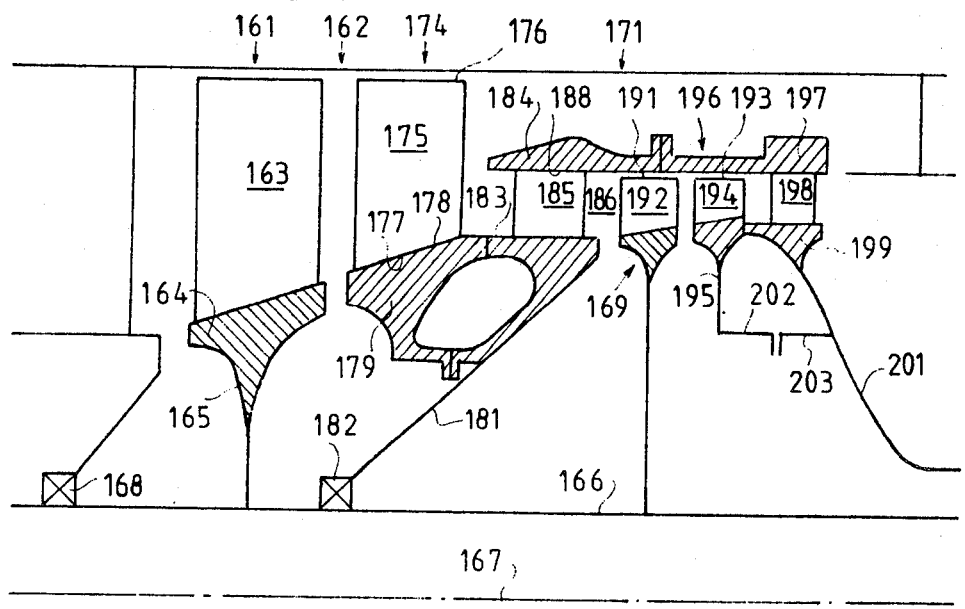
FIG. 4 is a diagrammatic view of a dual flow turbojet in accordance with the invention.

In a dual flow turbojet in accordance with the invention, as shown in FIG. 4, the first wheel 161 of the axial compressor 162 has blades 163 mounted on a rim 164 and has a disk 165 fixed directly to the central shaft 166 which is mounted to rotate about the axis 167 of the turbojet by means of bearings, one of which is visible in the figure at 168. The second wheel 174 of the compressor 162 has blades 175 with free outer ends 176, and with their inner ends 177 mounted on a surface 178 of a rim 179 on a conical plate 181 resting on the shaft 166 via a bearing 182.

The rim 179 is connected by its other surface 183 to a coupling ring 184 by a small number, eg. five, radial spokes 185 which are regularly spaced angularly around the axis 167, with a space 186 arranged between the surface 183 of the inner rim 179 and the inner surface 188 of the coupling ring 184 opposite the trailing edges of the blades 175. The coupling ring 184 and the rim 179 thus constitute a rotating shell. The inner surface 188 surrounds, at a distance, both the ends 191 of the blades 192 on the wheel 169 of the compressor's low pressure stage 171, and the ends 193 of the blades 194 on the wheel 195 of the compressor's high pressure stage 196. The downstream portion 197 of the coupling ring 184 is connected via a small number, eg. five, streamlined radial spokes to the rim 199 on a conical sheet 201 rotatably mounted on the shaft 166. Flanges 202 and 203 connect the wheel 195 to the conical sheet 201. The motion of the wheel 195 is thus transmitted by the rim 199, the radial spokes 198, the coupling ring 184, and the spokes 185 to the inner rim 179 of the wheel 174, which is thereby driven in the opposite direction to the wheel 161 without the blades having to transmit mechanical force.

The arrangement in accordance with the invention avoids the intermediate disk around the fan of the conventional arrangement which increases the diameter of the wheel and reduces efficiency.

The coupling ring 184 is disposed to allow a portion of the compressor flow go outside it directly to a secondary exhaust nozzle.

What is claimed is:

1. A turbojet comprising:

turbine means including first and second turbine wheels which rotate in opposite directions during operation of the turbojet, multistage compressor means including an inner and an outer rotor driven by said first and second turbine wheels, respectively, said inner rotor including a first bladed wheel and a second bladed wheel, both connected to a common inner shaft, said outer rotor including a first bladed wheel and a second bladed wheel arranged alternately with said first and second bladed wheels of the inner rotor and arranged in axial succession upstream from said turbine means for defining an axial gas flow channel extending towards said turbine means, said outer rotor comprising:

an outer shaft rotatably arranged around said inner shaft, and coupled to said first turbine wheel, ring means arranged around the second blade wheel of said inner rotor and defining an outer boundary of said gas flow channel at said second bladed wheel of the inner rotor, first connection means extending radially inwardly from said ring means towards said outer shaft, on the downstream side of said second bladed wheel of the inner rotor, said first connecting means comprising spokes crossing said gas flow channel, said second bladed wheel of the outer rotor being connected to said first connecting means between said spokes and said outer shaft, second connecting means between said ring means and said first bladed wheel of the outer rotor, said second connecting means extending radially inwardly on the upstream side of said second blade wheel of the inner rotor, and comprising spokes crossing said gas flow channel, and a conical flange extension supported rotatably on said inner shaft, said first stage wheel of the outer rotor being supported on said conical flange.

2. A turbojet of claim 1 wherein said bladed wheels of the outer rotor have ends facing the inner surface of the ring means with clearance therebetween.

3. The turbojet of claim 1 wherein the blades of the most upstream one of said bladed wheels of the outer rotor protrude radially outwardly with respect to said ring means thereby defining an inlet of an auxiliary annular gas flow channel.

4. The turbojet of claim 1 wherein said first and second turbine wheels are the low pressure stage and the high pressure stage of the turbine means, respectively.

5. A turbojet of claim 1 further comprising a combustion chamber between said compressor means and said turbine means.

6. A turbojet of claim 1 wherein said spokes of the connection between said ring means and the reminder of the outer rotor extend generally parallel to the direction of said gas flow channel, thereby having substantially no deflecting effect on the gas flow.

7. A turbojet of claim 1 wherein said spokes are thick relative to the compressor wheel blades and being relatively few in number, on each side of said second bladed wheel of the inner rotor.

8. A turbojet of claim 7 wherein said spokes are relatively rigid to provide a mechanical connection between said ring means and said outer rotor, the blades on said blade wheels of said inner and outer rotors being disconnected from said ring means.

* * * * *